(12) United States Patent
Lim

(10) Patent No.: US 7,840,491 B2
(45) Date of Patent: Nov. 23, 2010

(54) METHOD AND APPARATUS FOR EXTENDING LICENSE OF CONTENT IN PORTABLE DEVICE

(75) Inventor: Jin-ho Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/124,320

(22) Filed: May 21, 2008

(65) Prior Publication Data

US 2009/0024521 A1 Jan. 22, 2009

(30) Foreign Application Priority Data

Jul. 16, 2007 (KR) .................... 10-2007-0071288

(51) Int. Cl.
*G06F 21/00* (2006.01)
(52) U.S. Cl. .......................... 705/59; 705/57
(58) Field of Classification Search ............ 705/59, 705/57
See application file for complete search history.

(56) References Cited

U.S. PATENT DOCUMENTS

| 7,461,249 | B1 * | 12/2008 | Pearson et al. ............ 713/156 |
| 2003/0046238 | A1 * | 3/2003 | Nonaka et al. ............ 705/51 |
| 2008/0118063 | A1 * | 5/2008 | Guzman et al. ............ 380/239 |
| 2008/0120347 | A1 * | 5/2008 | Jupin ......................... 707/200 |
| 2008/0120656 | A1 * | 5/2008 | Jupin ......................... 725/70 |
| 2008/0120666 | A1 * | 5/2008 | Guzman et al. ............ 725/110 |
| 2008/0295182 | A1 * | 11/2008 | Ogai .......................... 726/29 |
| 2009/0037336 | A1 * | 2/2009 | Sunata ....................... 705/59 |

* cited by examiner

*Primary Examiner*—Pierre E Elisca
(74) *Attorney, Agent, or Firm*—Jefferson IP Law, LLP

(57) ABSTRACT

A method and apparatus for extending a license of a content in a portable multimedia device includes receiving an instruction to extend the license, analyzing the received instruction for type of an extension of the license, and updating the data for controlling use of the content, which is included in the license, and payment data regarding payment for the extension of the license, based on the analysis, so that the license of the content can be extended in the portable multimedia device without the portable multimedia device having to be connected to an external device.

22 Claims, 5 Drawing Sheets

METHOD AND APPARATUS FOR EXTENDING LICENSE OF CONTENT IN PORTABLE DEVICE

CROSS-REFERENCE TO RELATED APPLICATION

This application claims all benefits accruing under 35 U.S.C. §119 from Korean Patent Application No. 2007-71288, filed on Jul. 16, 2007, in the Korean Intellectual Property Office, the disclosure of which is incorporated herein by reference.

BACKGROUND OF THE INVENTION

1. Field of the Invention

Example embodiments of the present invention relate to a method and apparatus for extending a license of a content, the license referring to data for controlling use of the content, and more particularly, to a method and apparatus for extending a license of a content in a portable multimedia device.

2. Description of the Related Art

A portable multimedia device can play back a content protected by digital rights management (DRM) technologies while a license of the content is valid. Once the license of the content expires, however, the content can no longer be played back. Thus, if a user wants to extend the license of the content, the user is required to connect the portable multimedia device to an apparatus, such as a personal computer (PC), to extend the license of the content. If the license of the content is not extended, the content still remains within the portable multimedia device but cannot be played back.

FIG. 1 is a block diagram for explaining a typical method of extending a license of a content. Referring to FIG. 1, described below will be a procedure for extending a license of a content that has been downloaded from a PC 120 by a portable multimedia device 110 in the case where the license of the content has already expired.

First, the PC 120 downloads a content protected by DRM technologies from a server 130. Next, the PC 120 transmits the downloaded content to the portable multimedia device 110. At this point, the PC also transmits a license of the content to the portable multimedia device 110. The license refers to data for controlling use of the content, and the license is stored in a region of the portable multimedia device 110 which a user cannot access. Finally, the user presses a "Play" button to play back the content stored in the portable multimedia device 110.

Based on the license, the portable multimedia device 110 determines whether a term (or a time period) of a validity of the content or a permitted number of playbacks of the content has expired, and plays back the content only if either the term of the validity or the permitted number of playbacks of the content has not expired or has been exceeded.

As described above, the content can be played back only if the license of the content is still valid. For example, the downloaded content may be played back for 3 months after the download, may be played back 100 times after the download, or may be played back until a particular date, such as Jun. 30, 2007. If the portable multimedia device 100 judges that the license of the content has expired, that is, if the portable multimedia device 100 determines that the term of the validity or the permitted number of playbacks of the content is exceeded, for example, the license needs to be extended to continue to play back the content.

A user connects the portable multimedia device 110 to the PC 120 and extends the license by using a computer program installed in the PC 120. For example, the user can extend the license stored in the portable multimedia device 110 by connecting the PC 120 to the server 130 by using the computer program installed in the PC 120, extending the license, and transmitting the extended license from the PC 120 to the portable multimedia device 110.

As described above, it is typically troublesome to extend a license of a content stored in the portable multimedia device 110 because, every time the license needs to be extended, the portable multimedia device 110 needs to be connected to the PC 120 so as to execute the computer program installed in the PC 120.

SUMMARY OF THE INVENTION

Example embodiments of the present invention provide a method and apparatus for extending a license of a content in a portable multimedia device without being connected to an external device or a server.

Additional aspects and/or advantages of the invention will be set forth in part in the description which follows and, in part, will be obvious from the description, or may be learned by practice of the invention.

According to example embodiments of the present invention, there is a method of extending a license of a content in a portable multimedia device using payment data, the license comprising data for controlling use of the content and the payment data comprising data for purchasing an extension of the license, the license and the payment data being stored in the portable multimedia device, the method including receiving an instruction to extend the license analyzing the received instruction for how the license is to be extended, and updating the data for controlling use of the content and the payment data regarding to payment for the extension of the license based on the analysis of the received instruction so as to extend the license.

According to example embodiments of the present invention, the method may further include synchronizing the updated data for controlling use of the content and the payment data with another data for controlling use of the content and the payment data stored in a data managing apparatus that manages the license and the payment data.

According to example embodiments of the present invention, the method may further comprise transmitting the updated data for controlling use of the content and the updated payment data to a server that administers the license and the payment data.

According to example embodiments of the present invention, the payment data may be money data indicating a total balance of deposited money that can be used to extend the license, and the update of the data for controlling use of the content and the payment data may extend either a term of a validity of the license or increase a permitted number of playbacks under the license of the content and deduct a predetermined amount of money from the money data that corresponds to the extended term of the validity or the increased permitted number of playbacks.

According to example embodiments of the present invention, the method may further include displaying a message inquiring a user whether to extend the license, wherein the instruction to extend the license is received in response to the displayed message.

According to example embodiments of the present invention, the display of the message may further include receiving a signal for selecting a particular content, and determining whether a license of the content selected based on the signal has expired, wherein the message is only displayed when the license has expired.

According to example embodiments of the present invention, a message displaying the payment data and extendable term of the license, where the term is calculated based on an available balance of the payment data, may further be displayed in the display of the message.

According to example embodiments of the present invention, a message displaying results of updating the license and the payment data may further be displayed.

According to example embodiments of the present invention, the data managing apparatus may store a second license and a second payment data, which are the license and the payment data prior to the update in the portable multimedia device, and which are updated by extending the license or depositing payment via the data managing apparatus, and the synchronization of the updated data may further include transmitting the updated license and payment data to the data managing apparatus, receiving a third license and a third payment data, generated using the result of comparing the updated license and the updated payment data to the updated second license and the updated second payment data, and replacing the updated license and payment data in the portable multimedia device with the third license and the third payment data.

According to example embodiments of the present invention, the license managing apparatus may manage the updated license and the payment data in synchronization with the server administering the license and the payment data.

According to another aspect of the present invention, a license extending apparatus includes a receiving unit to receive an instruction to extend a license of content, an analyzing unit to analyze the received instruction, and a data updating unit to update data for controlling use of the content, which is included in the license, and payment data indicating the total balance of deposited money that can be used to extend the license.

According to example embodiments of the present invention, the license extending apparatus may further include a data synchronizing unit to synchronize the updated data for controlling use of the content and the payment data with data for controlling use of the content and the payment data stored in a data managing apparatus for managing the license and the payment data.

According to example embodiments of the present invention, the license extending apparatus may further include a displaying unit to display a message inquiring a user whether to extend the license, wherein the instruction is received in response to the displayed message.

According to example embodiments of the present invention, the license extending apparatus may further include a determination unit to determine whether a license of a particular content has expired, wherein the determination unit determines whether a license of the particular content has expired when the receiving unit receives a signal for selecting the content, and the displaying unit selectively displays the message based on the determination.

According to example embodiments of the present invention, the license managing apparatus may store a second license and a second payment data, which are the license and the payment data prior to the update, and the data synchronizing unit may include a data transmitting unit to transmit the updated license and payment data to the data managing apparatus, a data receiving unit to receive a third license and a third payment data, generated using the result of comparing the updated license and the updated payment data to an updated second license and an updated second payment data, and a data renewing unit to replace the license and the payment data in the portable multimedia device with the third license and the third payment data.

According to another aspect of the present invention, there is a computer readable recording medium having recorded thereon a computer program instructions for executing the method including receiving an instruction instructing to extend the license, analyzing the received instruction, and updating the data for controlling use of the content, which is included in the license, and payment data regarding to payment for the extension of the license, based on the analysis.

According to example embodiments of the present invention, there is a method of extending a license to allow reproduction of a content stored in a portable multimedia device using a license extender in the portable multimedia device, the license extender containing the license and a balance information, the method including: receiving an instruction to extend the license; determining how the license is to be extended and a cost of an extension of the license based on the received instruction; extending the license based on the received instruction; and updating the license and balance information of the license extender according to extension of the license and the cost of the extension of the license.

According to example embodiments of the present invention, there is a portable multimedia device to reproduce a content based on a license to allow reproduction of the content, the portable multimedia device including: a memory to store the content; a license extender containing the license and a balance information, and to extend the license by receiving an instruction to extend the license, determining how the license is to be extended and a cost of an extension of the license based on the received instruction, extending the license based on the received instruction, and updating the license and balance information of the license extender according to extension of the license and the cost of the extension of the license.

According to example embodiments of the present invention, there is a method of extending a license of a content in a portable multimedia device without the portable multimedia device having to be connected to an external device that extends the license, the method including: receiving an instruction to extend the license; analyzing the received instruction for how the license is to be extended; and updating the license and a payment data regarding payment for the extension of the license based on the analysis of the received instruction so as to extend the license.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
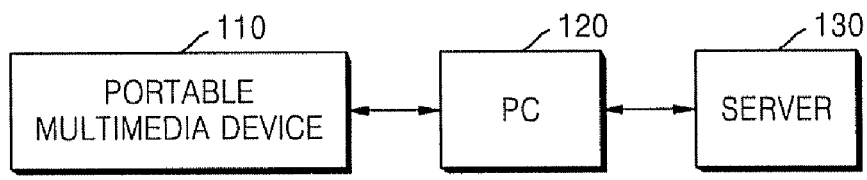
FIG. 1 is a block diagram for explaining a typical method of extending a license of content.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
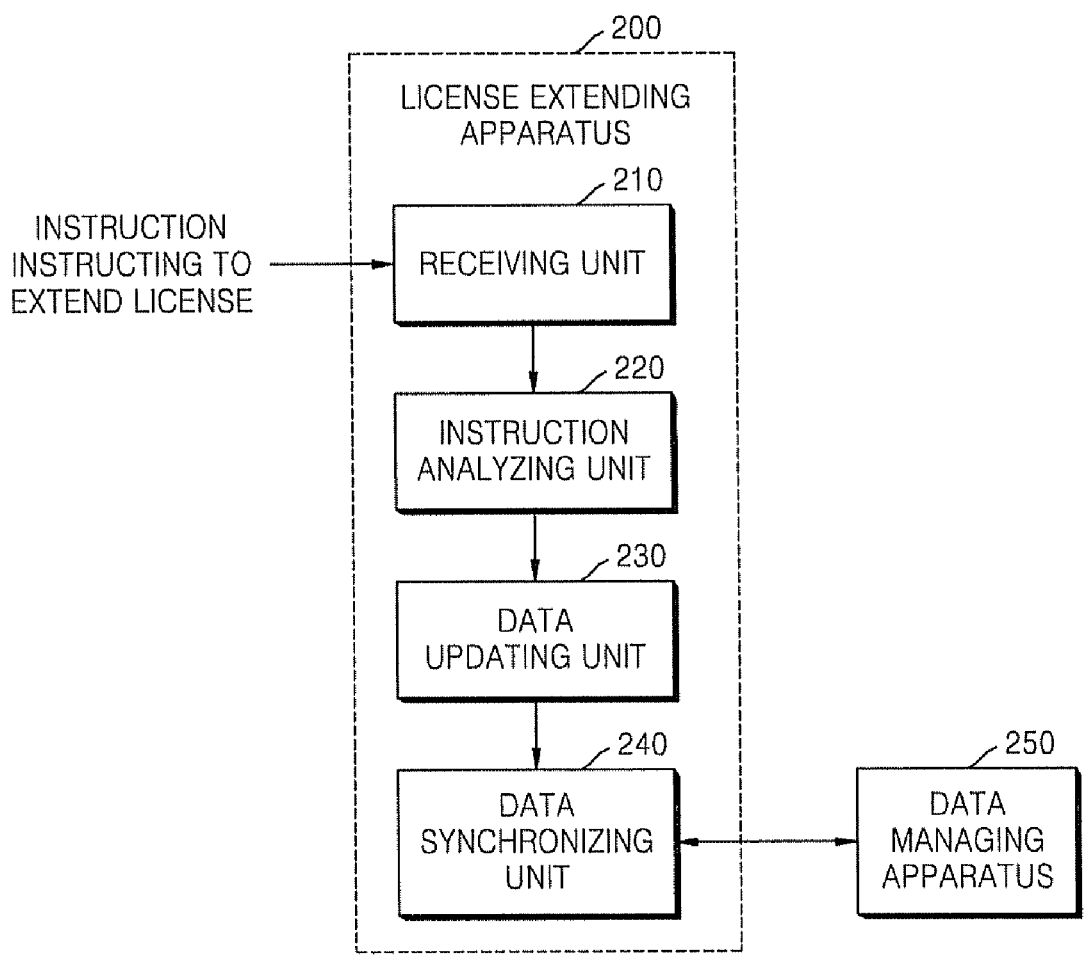
FIG. 2 is a block diagram of a license extending apparatus in a portable multimedia device according to an example embodiment of the present invention.

FIG. 2 is a block diagram of a license extending apparatus 200 in a portable multimedia device according to an example embodiment of the present invention. Referring to FIG. 2, the license extending apparatus 200 includes a receiving unit 210, an instruction analyzing unit 220, a data updating unit 230, and a data synchronizing unit 240. For convenience of explanation, a license managing apparatus 250 is further shown in FIG. 2, though the license managing apparatus 250 is not part of the license extending apparatus 200 in this example embodiment.

As shown in FIG. 2, the receiving unit 210 receives an instruction to extend (or renew) a license of a content. The instruction can be received by the receiving unit 210 when a user presses a predetermined button, for example, on the portable multimedia device. For example, when a message queries the user whether to extend the license of the content, such as by displaying a "Do you wish to extend this license?" message, or "Do you wish to extend the license of this content?" message, the user can instruct to extend the license by pressing a "Confirm" button in response to the message. According to example embodiments of the present invention, the user not only can confirm an extension of the license, but also can designate the term of the license or the permitted number of playbacks (i.e., reproductions, or uses), for example. In other example embodiments, other characteristics of the license may be designated, such as an identity of a device that can play back or reproduce the content.

As shown in FIG. 2, the instruction analyzing unit 220 analyzes an instruction received by the receiving unit 210. For example, the instruction analyzing unit 220 analyzes how the license of content is to be extended. That is, the instruction analyzing unit 220 determines the extended term of the license or the updated permitted number of playbacks of the content, for example. In example embodiments of the present invention, the license extending apparatus 200 may further include a displaying unit (not shown) to display messages, such as those discussed above, as well as information of the content and the license. Based on the analysis by the instruction analyzing unit 220, the data updating unit 230 updates a license data, where the data is included in the license of the content, and updates a payment data regarding payment for the extension of the license.

The payment data includes money data showing a total balance of money that may be used to extend the license, point data showing a total balance of points, or other non-monetary units that may be used to extend the license, and all other data which may be modified or updated in correspondence to the extension of the license. In example embodiments of the present invention, non-monetary units may include airline mileage, loyalty points, and/or virtual currency.

For convenience of explanation, hereinafter, the payment data is assumed to be money data, but it should be understood that the non-monetary units are within the scope of the invention. Further for sake of example, currency unit used herein is the Korean won, but it should be understood that any currency unit is also within the scope of the invention.

Again referring to FIG. 2, the data updating unit 230 may update the license by extending either the term of the validity or securing additional permitted number of playbacks of the content, and deducting a set amount of money from an available balance of the money data. For example, when 5,000 Korean won is the available balance of or deposited money data and the content is set to be valid until Jul. 30, 2007, and if an instruction to extend the license of the content for another 3 months beyond the initial expiration date is received, then the data updating unit 230 updates the license so that the content would be valid until Sep. 30, 2007 and stores 2,000 Korean won as the balance of the money data after deducting 3,000 Korean won from the money data as the price for the 3 month extension of the license. The data updating unit 230 updates the license and the money data even when the license extending apparatus 200 is not connected to the license managing apparatus 250 for managing the license and the money data. In example embodiments, the license may be extended even without an available balance, and may be extended based on credit or some other payment information, such as credit card information.

Examples of the license managing apparatus 250 include all devices capable of relaying data between the license extending apparatus 200 and a server and capable of managing the license and the money data, such as a personal computer (PC), a personal digital assistant (PDA), a laptop computer, etc. Thus, based on available balance, or credit, the license can be updated immediately, with reconciliation or settling of the accounts to be performed later via a connection to the license managing apparatus 250. In example embodiments of the present invention, a connection between the license extending apparatus 200 and the license managing apparatus 250 may be by way of a cable or other wired connections, as well as by wireless connections.

As described above, the license extending apparatus 200 according to an example embodiment of the present invention can extend the license of the content even when the license extending apparatus 200 is not connected to the license managing apparatus 250, and thus avoids the trouble of connecting the license extending apparatus 200 to the license managing apparatus 250 every time the license needs to be extended.

Again referring to FIG. 2, the data synchronizing unit 240 synchronizes the license and the money data updated by the data updating unit 230 with the license and the money data stored in the license managing apparatus 250. Accordingly, in example embodiments of the present invention, the license and the money data of the data updating unit 230 is reconciled with the license and the money data of the license managing apparatus 250 via the data synchronizing unit.

Figure 3:
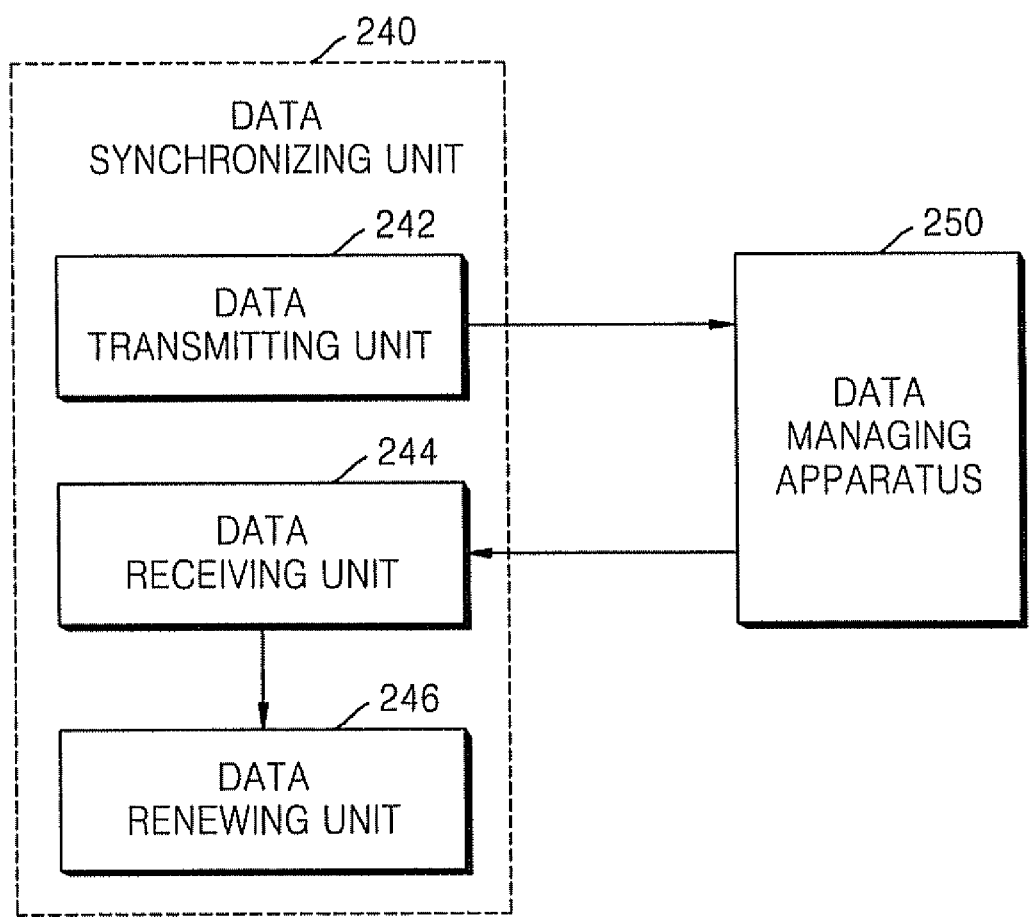
FIG. 3 is a block diagram of a data synchronizing unit shown in FIG. 2.

FIG. 3 is a block diagram of the data synchronizing unit 240. Referring to FIG. 3, the data synchronizing unit 240 includes a data transmitting unit 242, a data receiving unit 244, and a data renewing unit 246. Also, the license managing apparatus 250 stores a license and the money data respectively corresponding (though not necessarily synchronized) to the license and the money data stored in the license extending apparatus 200 as will be explained below.

For purposes of discussion, it is assumed that the license and the money data stored in the license extending apparatus 200 and the license and the money data stored in the license managing apparatus 250 are identical when the license extending apparatus 200 and the license managing apparatus 250 are connected initially, and prior to any extension of a purchased license or any additional deposits to increase the balance of the money data. For example, if a user had purchased a right to use a content for 3 months via the license managing apparatus 250 and a balance of money data after the purchase was 5,000 Korean won, the license stored in both the license extending apparatus 200 and the license managing apparatus 250 became valid for 3 months from a date of the purchase, and the balances of the money data stored in both the license extending apparatus 200 and the license managing apparatus 250 became 5,000 Korean won.

Hereinafter, for convenience of explanation, the license and the money data stored in the license extending apparatus 200 are respectively referred to as a first license and first money data, while the license and the money data stored in the license managing apparatus 250 are respectively referred as the second license and the second money data in the following descriptions of the data transmitting unit 242, the data receiving unit 244, and the data renewing unit 246.

Referring again to FIGS. 2 and 3, after the purchase of the content, and when the license is extended, the data updating unit 230 updates the first license and the first money data, the data transmitting unit 242 of the data synchronizing unit 240 transmits the updated first license and the updated first money data to the license managing apparatus 250. The license managing apparatus 250 then generates a third license and third money data using a result of comparing the updated first license and the updated first money data (from the license extending apparatus 200) to the second license and the second money data (of the license managing apparatus 250), and transmits the generated third license and the generated third money data to the data receiving unit 244. As discussed, the generated third license and the generated third money data is a most up to date data on the license and the money data.

For example, assuming that the term of the validity of content is set to expire on Jun. 30, 2007 in both the first and the second license while the balances of both the first and the second money data are each 5,000 Korean won, after a purchase, if the license extending apparatus 200 extends the term of the validity of the content of the first license for another 3 months and the cost of extending the first license for the 3 months is 2,000 Korean won, the term of the validity of the content in the first license is updated to expire on Sep. 30, 2007 but the balance of the first money data then becomes 3,000 Korean won so that the first license and the first money data are updated. Meanwhile, if 5,000 Korean won are further deposited via the license managing device 250, the term of the validity of the content in the second license is unchanged from Jun. 30, 2007, but the balance of the second money data becomes 10,000 Korean won so that the second money data is updated.

Then, when the license extending apparatus 200 and the license managing apparatus 250 are connected and when the third license and the third money data are generated using the result of comparing the updated first license and the updated first money data to the second license and the updated second money data, the term of the validity of the content in the third license is set to expire on Sep. 30, 2007 since the term of the validity of the content is extended in the first license, and also, the balance of the third money data becomes 8,000 Korean won since 2,000 Korean won have been deducted from the first money data but 5,000 Korean won was added to the second money data. In other words, the third license and the third money data are respectively generated in view of the changes in the first and second licenses, and the first and second money data.

The license managing apparatus 250 then transmits the generated third license and the third money data to the data transmitting unit 244. As discussed above, the license extending apparatus 200 needs to be connected to the license managing apparatus 250 in order to perform data synchronization between the license extending apparatus 220 and the license managing apparatus 250. However, in the meantime, a license is extended immediately by using the license extending apparatus 200. In other words, the license extending apparatus 200 according to an example embodiment of the present invention is more convenient for a user because the license extending apparatus 200 needs to be connected to the license managing apparatus 250 only when performing the synchronization, and the license extending apparatus 200 does not have to be connected to the license managing apparatus 250 every time the license of the content needs to be extended.

Meanwhile, the license managing apparatus 250 manages the license and the money data in synchronization with a server (not shown) that also manages the license and the money data. In other words, the license managing apparatus 250 stores the third license and the third money data and transmits the third license and the third money data to the server so that the third license and the third money data can be reflected in the server. The license managing apparatus 250 is not in the server, but is located in the PC or an intermediary device that is between the portable multimedia device and the server in this example embodiment. Additionally, the license extending apparatus 200 is located in a content reproducing device, such as the portable multimedia device in this example embodiment.

Referring back to FIG. 3, the data renewing unit 246 replaces the first license and the first money data in the license extending apparatus 200 with the third license and the third money data. Consequently, the third license and the third money data is used to update the first license and the first money data in the license extending apparatus 200, and to update the second license and the second money data in the license managing apparatus 250 after the synchronization is performed.

For example, when the term of the validity of the content expires on Jun. 30, 2007 in the first license and the balance of the first money data is 5,000 Korean won, and if the term of the validity of the content expires on Sep. 30, 2007 in the third license and the balance of the third money data is 8,000 Korean won, the data renewing unit 246 renews or updates the first license and the first money data such that the term of the validity of the content expires on Sep. 30, 2007 and the balance of the first money data is 8,000 Korean won. Accordingly, the license extending apparatus 200 synchronizes the license and the money data (the first license and the first money data) stored in the license extending apparatus 200 with the license and the money data (the third license and the third money data) stored in the license managing apparatus 250.

While the description above has been given in regard to money data for convenience of explanation, the present invention is not limited thereto, and the money data may be replaced by any payment data including money data, point data, or any data which can be modified in correspondence to securing or extending a license. In other example embodiments, the license extending apparatus 200 can also be connected directly to the server without being connected via the license managing apparatus 250.

Figure 4:
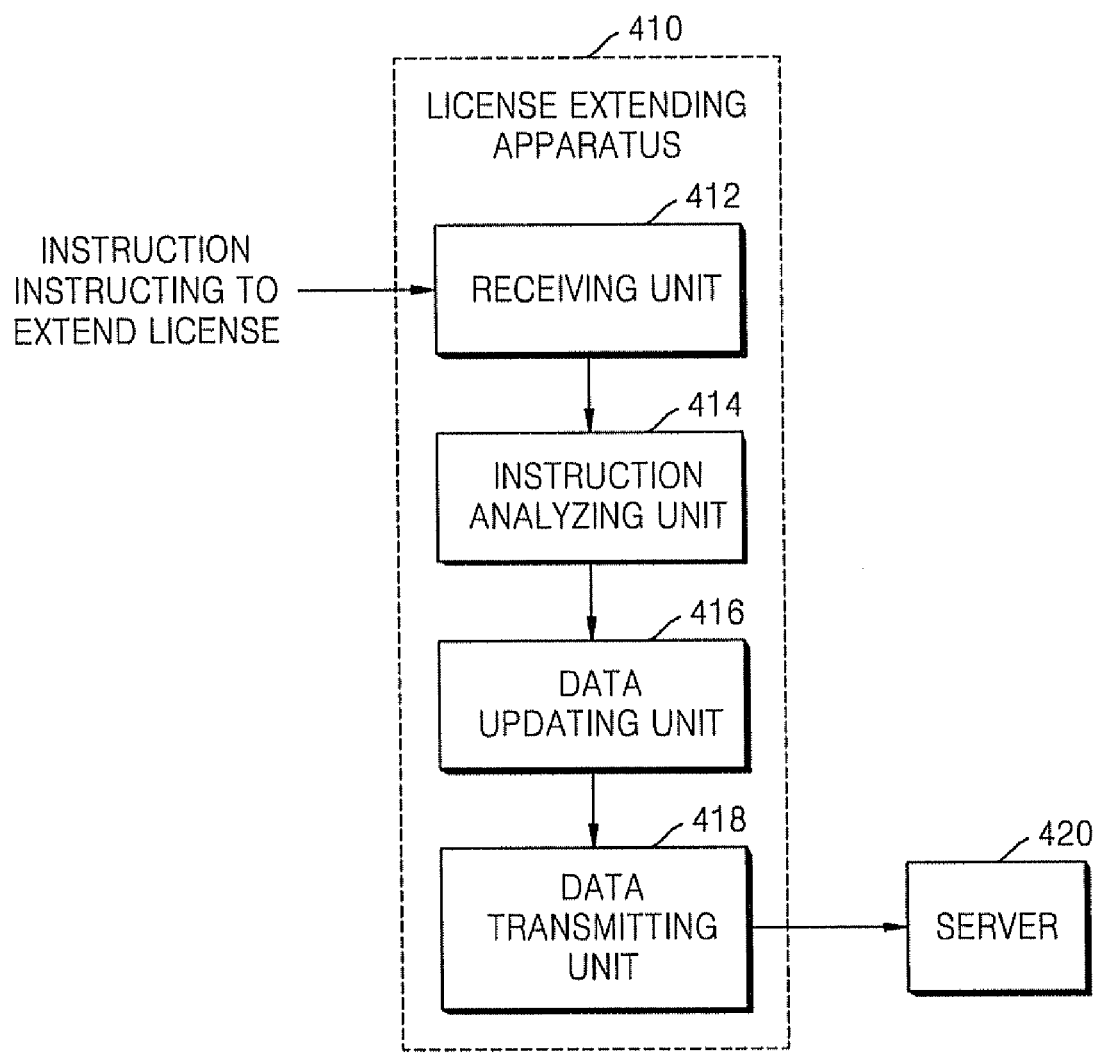
FIG. 4 is a block diagram of a license extending apparatus in a portable multimedia device, according to another example embodiment of the present invention.

FIG. 4 is a block diagram of a license extending apparatus 410 in a portable multimedia device, according to another example embodiment of the present invention. Referring to FIG. 4, the license extending apparatus 410 can be connected directly to a server 420 without a license managing apparatus 250 as shown in FIG. 2 (such as a PC). In other words, the license extending apparatus 410 shown in FIG. 4 also functions as a data managing apparatus, and it is possible to either purchase a content from the server 420 or deposit money directly thereto by using the license extending apparatus 410. Hereinafter, a license extending apparatus with function of the data managing apparatus is referred to as a license managing apparatus.

The license extending apparatus 410 shown in FIG. 4 includes a receiving unit 412, an instruction analyzing unit 414, a data updating unit 416, and a data transmitting unit 418. Operations performed by the receiving unit 412, the instruction analyzing unit 414, and the data updating unit 416 are respectively the same as those of the receiving unit 210, the instruction analyzing unit 220, and the data updating unit 230 shown in FIG. 2, except that the receiving unit 412 shown in FIG. 4 can receive a content directly from a server 420, unlike the receiving unit 210. Thus, similar descriptions of the receiving unit 412, the instruction analyzing unit 414, and the data updating unit 416 are not repeated below. In the example embodiment shown in FIG. 4, the data transmitting unit 418 transmits license and money data updated by the data updating unit 416 to the server 420.

While purchasing a content and depositing of money can be done with the license managing apparatus 250 in the example embodiment of FIG. 2, both the purchasing of the content and the depositing of money can also be done with the license extending apparatus 410 in the example embodiment of FIG. 4. Thus, license and money data in the license extending apparatus 410 and license and money data in the server 420 can be synchronized by simply transmitting an updated license and an updated money data from the license extending apparatus 410 to the server 420.

Figure 5:
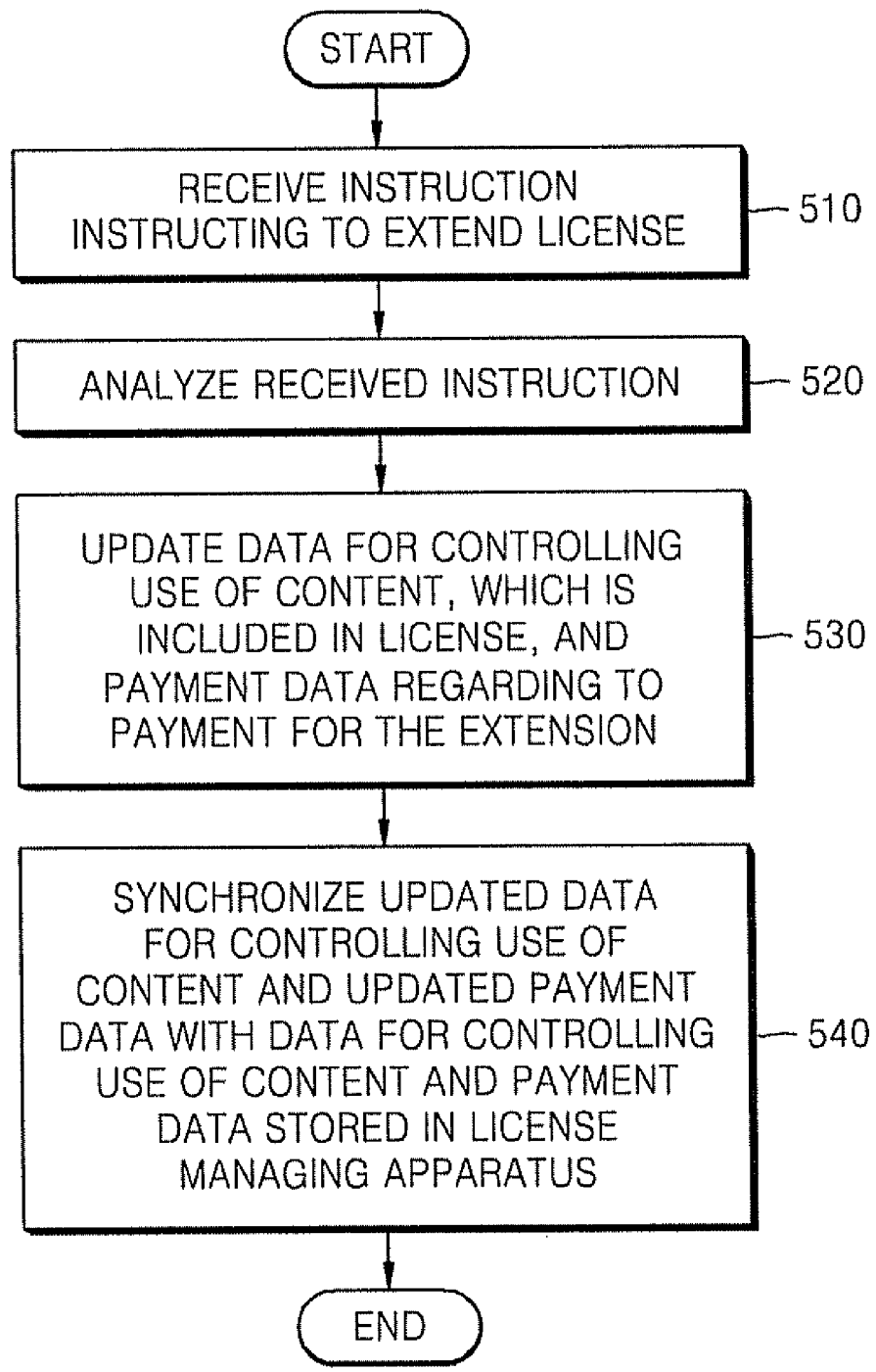
FIG. 5 is a flowchart of a method of extending a license of a content in a portable multimedia device, according to an example embodiment of the present invention.

FIG. 5 is a flowchart of a method of extending a license of a content in a portable multimedia device, according to an example embodiment of the present invention. In operation 510, an instruction to extend a license of a content is received. In operation 520, the received instruction is analyzed for how the license is to be extended.

In operation 530, the license and payment data are updated based on the analysis, wherein the update is performed without a license extending apparatus in a portable multimedia device having to be connected to a data managing apparatus. In operation 540, the updated license and payment data are synchronized with license and payment or money data in the data managing apparatus. The synchronization of the license and payment or money data is performed only when the license extending apparatus is connected to the data managing extending apparatus according to an example embodiment of the present invention. Also, when the license extending apparatus also functions as the data managing apparatus, and is referred to as a license managing apparatus, the synchronization is performed only when the license managing apparatus is connected to a server according to another example embodiment of the present invention.

In the example embodiment shown in FIG. 4, the updated license and payment or money data in the license extending apparatus are made to correspond to the license and the payment or money data in the server by simply transmitting the updated license and the payment or money data to the server, so that synchronization of data in the license extending apparatus and the server is completed.

Figure 6:
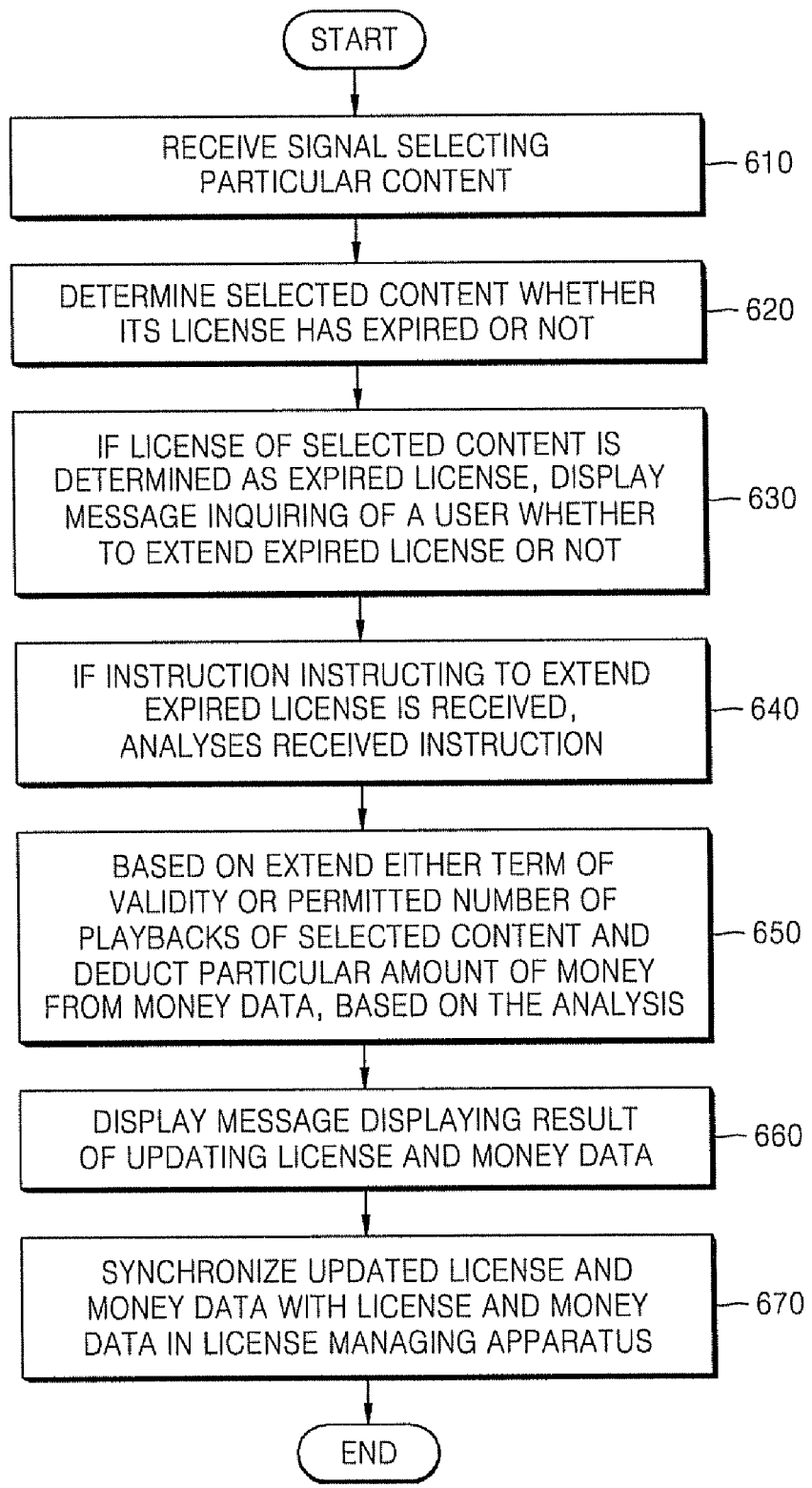
FIG. 6 is a flowchart of an application of the method of extending a license of a content according to another example embodiment of the present invention.

FIG. 6 is a flowchart of an application of the method of extending a license of a content according to another embodiment of the present invention. In operation 610, a signal to select a particular content is received. In operation 620, it is determined whether a license of the selected content has expired. A license extending apparatus according to an example embodiment of the present invention may further include a determination unit (not shown) to determine whether a license of a content has expired when a receiving unit receives a signal selecting the particular content, but such is not required, as the determination can simply be performed by the license extending apparatus.

In operation 630, if the determination unit determines that the license has expired, a message asking whether a user will extend the license is displayed. A message showing money data, and an extendable license period calculated by using a balance of the money data, may further be displayed at the same time. For example, a message such as "Current balance of your account is 5,000 Korean won, and you can extend this license for up to 6 months by using the balance. Do you wish to extend this license?" may be displayed.

According to example embodiments of the present invention, operation 610 and/or the operation 630 may be omitted. In other words, if an instruction to extend a license is received even while the license has not yet expired, the extension of the license may be carried out to simply extend or add to the existing license. In another example embodiment, the player may be optionally set to automatically extend the license if a balance is available to do so until the balance is exhausted.

Referring back to FIG. 6, in operation 640, if an instruction to extend the license is received, the instruction is analyzed for how the license is to be extended. In operation 650, either the term of a validity of the content or a permitted number of playbacks included in the license is extended or increased based on the analysis, and a particular amount of money is deducted from the balance of the money data. In operation 660, a message indicating updated results of the license and the money data is displayed. For example, a message such as "The license of this content is extended to Dec. 31, 2007, and your current balance is 1,000 Korean won." may be displayed. In operation 670, the updated license and the updated money data are synchronized with a license and a money data in a license extending apparatus or a license managing apparatus.

Also, as described above, the updated license and the updated money data may be synchronized directly with the license and the money data in a server if the license extending apparatus can be connected directly to the server without the data managing apparatus to act as an intermediary, for example, as when a license managing apparatus is used.

In example embodiments of the present invention, a content refers to any audio data, such as songs, albums, or performances, for example, but also to any non-audio data that is reproducible, such as text, programs, menus, images and/or video, for example. Such non-audio data may be reproduced in conjunction with the audio data. The content may be a digital media file or may be streaming audio and/or multimedia data.

In example embodiments of the present invention, in addition to extending the licenses, the above method may apply to when a license is first obtained or purchased.

The license extending or the license managing functions need not be performed by an apparatus, and may be computer programs that are downloaded onto the portable multimedia device or may be device specific applications. If downloaded, the program may be downloaded when a user or an owner of the device first signs up to use the content providing service, such as a music downloading service.

Example embodiments of the present invention can be implemented in software or hardware, such as, for example, a field programmable gate array (FPGA), or an application specific integrated circuit (ASIC). As such, it is intended that the processes described herein be broadly interpreted as being equivalently performed by software, hardware, or a combination thereof.

In example embodiments, in addition to determining a validity of the license, authenticating a license is also within scope of the present invention.

In example embodiments, the license extending apparatus or the license managing apparatus may be located in a portable multimedia device since the portable multimedia device is able to reproduce the content based on a valid license.

In example embodiments, the license extending apparatus may be located within a content reproducing device, such as the portable multimedia device, but may also be in a cell phone, a personal digital assistant, a portable computer, or other small electronic devices capable of reproducing the content.

In various aspects, and/or refers to alternatives chosen from available elements so as to include one or more of the elements. For example, if the elements available include elements X, Y, and Z, and/or refers to X, Y, Z, or any combination thereof.

The example embodiments of the present invention may also be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media. Also, aspects of the invention may also be embodied in computer-readable code embodied as a computer data signal in a carrier wave (e.g., transmission through the Internet).

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A method of extending a license of a content in a portable multimedia device using payment data, the license comprising data for controlling use of the content and the payment data comprising data for purchasing an extension of the license, the license and the payment data being stored in the portable multimedia device, the method comprising:

receiving, by the portable multimedia device, an instruction to extend the license;

analyzing, by the portable multimedia device, the received instruction for how the license is to be extended;

updating, by the portable multimedia device, the data for controlling use of the content and the payment data regarding payment for the extension of the license based on the analysis of the received instruction so as to extend the license; and synchronizing, by the portable multimedia device, the updated data for controlling use of the content and the payment data with another data for controlling use of the content and the payment data stored in a data managing apparatus that manages the license and the payment data.

2. The method of claim 1, further comprising transmitting the updated data for controlling use of the content and the updated payment data to a server that administers the license and the payment data.

3. The method of claim 1, wherein the payment data is money data indicating a total balance of deposited money that can be used to extend the license, and the updating of the data for controlling use of the content and the payment data extends either a term of a validity of the license or increases a permitted number of playbacks under the license of the content and deducts a predetermined amount of money from the money data that corresponds to the extended term of the validity or the increased permitted number of playbacks.

4. The method of claim 1, further comprising displaying a message inquiring a user whether to extend the license, wherein the instruction to extend the license is received in response to the displayed message.

5. The method of claim 4, wherein the displaying of the message further comprises:

receiving a signal for selecting a particular content; and determining whether a license of the content selected based on the signal has expired, wherein the message is only displayed when the license has expired.

6. The method of claim 4, wherein the displaying of the message further comprises a message displaying the payment data and an extendable term of the license, where the term is calculated based on an available balance of the payment data.

7. The method of claim 1, wherein the updating of the data for controlling use of the content and the payment data further comprises displaying a message displaying results of the updating of the license and the payment data.

8. The method of claim 1, wherein the data managing apparatus stores a second license and second payment data, which are the license and the payment data prior to the update in the portable multimedia device, and which are updated by extending the license or depositing payment via the data managing apparatus, and the synchronizing of the updated data further comprises:

transmitting the updated license and payment data to the data managing apparatus;

receiving a third license and a third payment data, generated using the result of comparing the updated license and the updated payment data to the updated second license and the updated second payment data; and replacing the updated license and payment data in the portable multimedia device with the third license and the third payment data.

9. The method of claim 1, wherein the data managing apparatus manages the updated license and the payment data in synchronization with a server administering the licenses and the payment data.

10. A license extending apparatus in a portable multimedia device to extend a license comprising data for controlling use of a content using payment data, the apparatus comprising:
- a receiving device to receive an instruction to extend the license of the content;
- an analyzing device to analyze the received instruction for how the license is to be extended;
- a data updating device to update the data for controlling use of the content and the payment data indicating a total balance of deposited money that can be used to extend the license based on the received instruction so as to extend the license; and
- a data synchronizing device to synchronize the updated data for controlling use of the content and the payment data with another data for controlling use of the content and the payment data stored in a data managing apparatus that manages the license and the payment data.

11. The apparatus of claim 10, further comprising a data transmitting device to transmit the updated data for controlling use of the content and the updated payment data to a server that administers the license and the payment data.

12. The apparatus of claim 10, wherein the data updating device updates the data for controlling use of the content and the payment data by extending either a term of a validity of the license or increasing a permitted number of playbacks under the license of the content and deducting a predetermined amount of money from the money data that corresponds to the extended term of the validity or the increased permitted number of playbacks.

13. The apparatus of claim 10, further comprising a displaying device to display a message inquiring a user whether to extend the license, wherein the instruction to extend the license is received in response to the displayed message.

14. The apparatus of claim 13, further comprising a determination device to determine whether a license of a particular content has expired,
wherein the determination device determines whether the license of the particular content has expired when the receiving device receives a signal for selecting the content, and the displaying device selectively displays the message based on the determination by the determination device.

15. The apparatus of claim 13, wherein the displaying device further displays a message displaying the payment data and an extendable term of the license, where the term is calculated based on an available balance of the payment data.

16. The apparatus of claim 13, wherein the displaying device further displays a message displaying the updated results of the license and the payment data.

17. The apparatus of claim 10, wherein the data managing apparatus stores a second license and second payment data, which are the license and the payment data prior to the update in the portable multimedia device, and which are updated by extending the license or depositing payment via the data managing apparatus, and the data synchronizing device comprises:
- a data transmitting device to transmit the updated license and payment data to the data managing apparatus;
- a data receiving device to receive a third license and a third payment data, generated using the result of comparing the updated license and the updated payment data to the updated second license and the updated second payment data; and
- a data renewing device to replace the updated license and the updated payment data in the portable multimedia device with the third license and the third payment data.

18. The apparatus of claim 10, wherein the data managing apparatus manages the updated license and the payment data in synchronization with a server administering the licenses and the payment data.

19. A computer readable recording medium having recorded thereon a computer program instructions to execute the method of claim 1.

20. A method of extending a license to allow reproduction of a content stored in a portable multimedia device using a license extender in the portable multimedia device, the license extender containing the license and a balance information, the method comprising:
- receiving, by the portable multimedia device, an instruction to extend the license;
- determining, by the portable multimedia device, how the license is to be extended and a cost of an extension of the license based on the received instruction;
- extending, by the portable multimedia device, the license based on the received instruction;
- updating, by the portable multimedia device, the license and balance information of the license extender according to extension of the license and the cost of the extension of the license; and
- synchronizing, by the portable multimedia device, the license and the balance information with that of another license and/or another balance information in a data manager, the data manager being external to the license extender and the portable multimedia device.

21. The method of claim 20, further comprising forwarding the license and the balance information to a server that provided an original license.

22. A portable multimedia device to reproduce a content based on a license to allow reproduction of the content, the portable multimedia device comprising:
- a memory to store the content;
- a license extender containing the license and a balance information, and to extend the license by receiving an instruction to extend the license, determining how the license is to be extended and a cost of an extension of the license based on the received instruction, extending the license based on the received instruction, and updating the license and balance information of the license extender according to extension of the license and the cost of the extension of the license; and
- a data synchronizing device to synchronize the license and the balance information with that of another license and/or another balance information in a data manager, the data manager being external to the license extender and the portable multimedia device.

* * * * *